Figure 1:
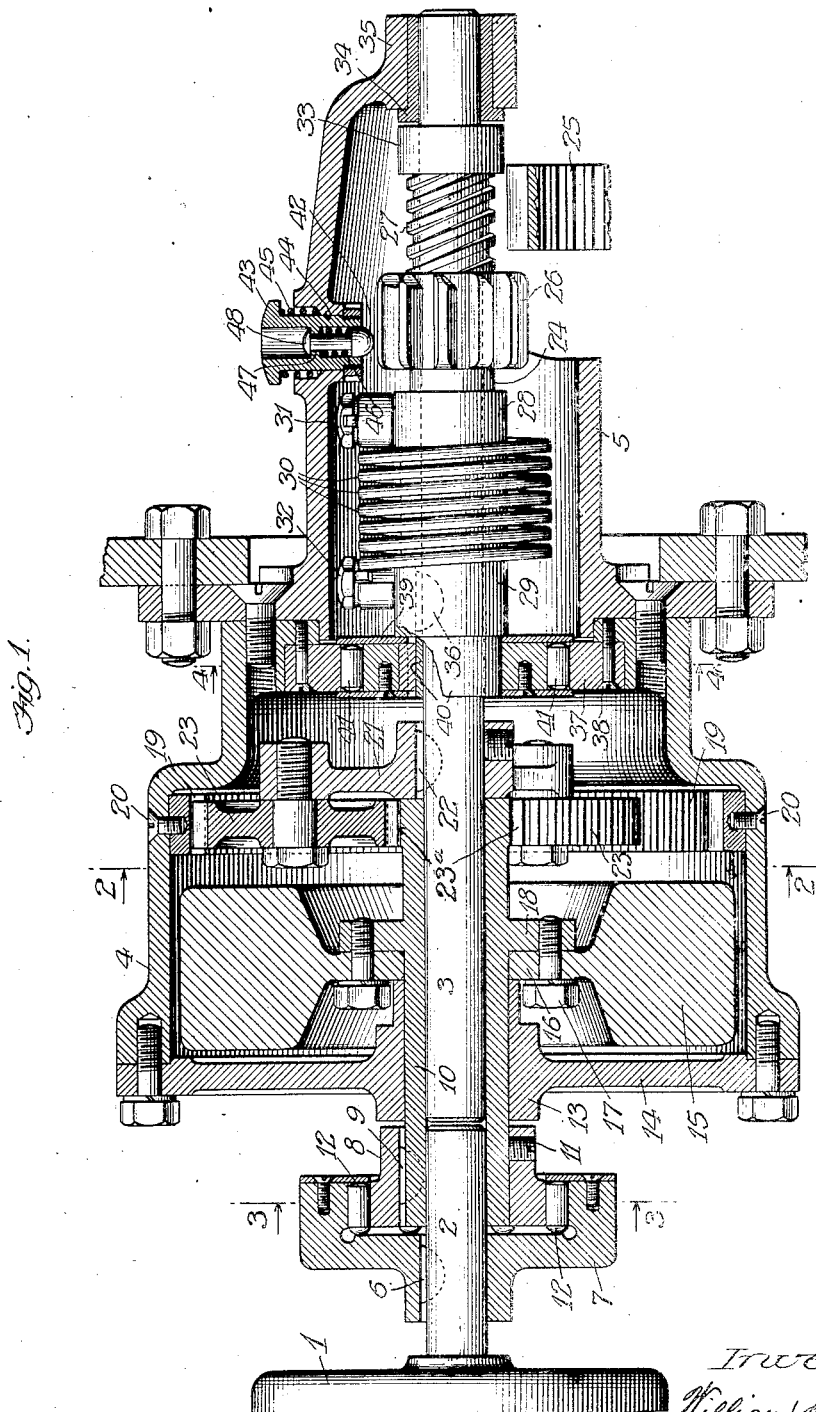

Dec. 3, 1929.  W. L. McGRATH  1,737,802
ENGINE STARTER
Filed Nov. 14, 1925  2 Sheets-Sheet 1

Witness
Martin H. Olsen

Inventor
William L. McGrath
By Rector, Hibben, Davis & Macauley
His Att'ys

Dec. 3, 1929.  W. L. McGRATH  1,737,802
ENGINE STARTER
Filed Nov. 14, 1925  2 Sheets-Sheet 2
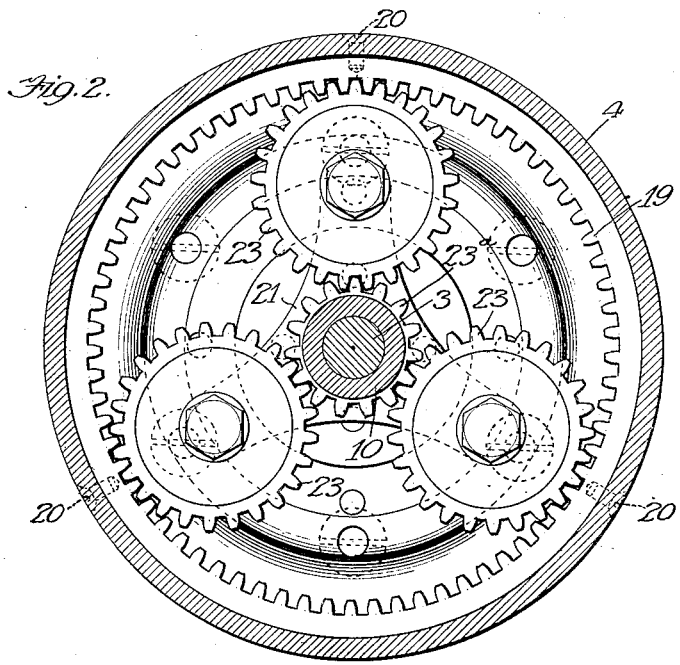
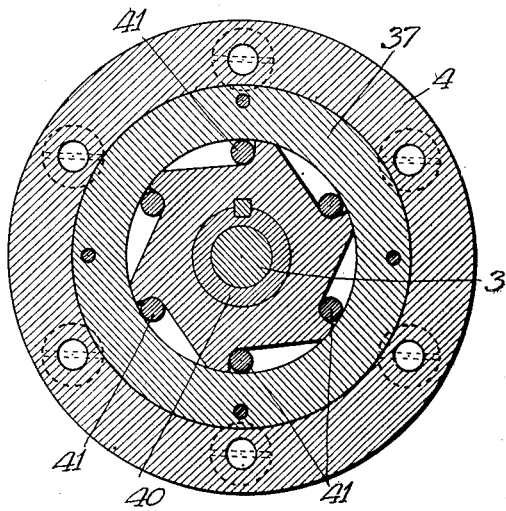

Patented Dec. 3, 1929

1,737,802

UNITED STATES PATENT OFFICE

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK

ENGINE STARTER

Application filed November 14, 1925. Serial No. 68,932.

My invention relates to engine starters for the starting of engines such as internal combustion engines, and the same pertains more particularly to the drive or transmission thereof between a prime mover, such as an electric motor, and a member of the engine to be started, such as the flywheel or any other rotatable part thereof. The object of my invention is to provide a simple, efficient and reliable apparatus of this kind characterized by the provision of a yielding driving connection, such as a torsion spring located in such transmission and cooperating with a driving member adapted to engage a member of the engine to be started and adapted to store up and apply the energy to such driving member in cooperation with means such as a one-way clutch for insuring the delivery of such energy only in the direction of the driving member whereby all such energy will be conserved and utilized.

In connection with the mechanism above described, I prefer to employ inertia means interposed in such transmission and also means such as a one-way clutch, for preventing backward rotation of such inertia means. While my apparatus is intended more particularly for the starting of airplane engines, it will be understood that it may be used for the starting of other types of engines, and I therefore contemplate using my invention wherever applicable.

In the drawings, Figure 1 is a sectional elevation of my engine starting apparatus; and Figs. 2, 3 and 4, sections thereof on the correspondingly numbered section lines of Fig. 1.

I have herein shown and will hereinafter describe a practical and my present recommended construction of apparatus, but it will be understood that my invention may be embodied in constructions of different kinds without departing from the spirit and scope thereof. Moreover, in the broader aspect of my invention, the inertia means and/or second one-way clutch need not be used.

Referring to the embodiment as herein shown, the power means or prime mover is an electric motor 1 having an extended armature shaft 2, in alinement with which is a driving shaft 3 having suitable bearings in a main casing 4 and a supplementary or extension casing 5. To the armature shaft, there is secured in suitable manner as by means of the key 6 a driving head 7 of a one-way clutch whose driven member 8 is secured to a long sleeve 10 in suitable manner as by means of the key 9 and the set screw 11. In the present instance, this clutch is of the roller friction type in which a series of rollers 12 are employed to operate in the well known manner between the driving and driven members thereof.

The sleeve 10 is a comparatively long sleeve journaled in the bearing 13 of the end plate 14 of the casing 4 and surrounding the adjacent ends of the shafts 2 and 3 and supporting the same. This sleeve also carries the inertia means and the reduction gearing as well as the driving member and its sleeve as hereinafter described.

The inertia means comprises a flywheel 15 having a considerable predetermined mass in its periphery and preferably though not necessarily forming a part separate from the sleeve. In the present instance, this flywheel has a hub 16 which is secured in suitable manner as by bolts 17 to a marginal flange 18 on the exterior of the sleeve intermediate its length. This flywheel is contained and rotates within the main casing 4.

The reduction means is of the planetary type consisting of a stationary internal gear 19 secured to the interior of the casing 4 in suitable manner as by the screws 20 and such gearing also comprises a spider 21 which is secured to the shaft 3 in suitable manner as by means of the key 22 and in which is journaled a series of planetary gears 23 meshing with the internal gear 19 and sun gear 23ª.

Upon the outer end portion of the shaft 3, there is mounted a sleeve 24 which is capable of slight longitudinal movement and rotary movement thereon and on which is mounted a driving member for longitudinal movement thereof into engagement with the engine member such as the flywheel 25 and also for rotary movement with such shaft 3. In the present instance, the driving member is in the form of a pinion 26 which is threaded upon the screw threaded portion 27 of the sleeve 24. This screw sleeve is provided with a driven head 28 which is operatively connected with a driving head 29 through the medium of a resilient torque transmitting device such as the coil driving spring 30 which is connected at its opposite ends by the bolts 31 and 32 with the driven head 28 and the driving head 29 respectively. The screw sleeve 24 is provided at its outer end with a stop nut 33 located adjacent the bushing 34 of the outer end bearing 35 of the driven shaft 3, such stop nut serving to arrest the pinion 26 in its outward longitudinal movement.

The driving head 29 is secured to the shaft 3 in suitable manner as by means of the key 36 and provision is made whereby this head is permitted to be rotated in one direction only, that is in its normal direction proper for the rotation of the engine member and the same is prevented from backward rotation or any tendency of such movement which would occur after the drive spring 30 has been wound in the starting operation and before the engine member has started to move. In the present instance, these means comprise a one-way clutch of the roller friction type. One member of this clutch is a ring 37 held stationarily and secured to the casing 4 by the screws 38. The other member of this clutch may be an integral part of the driving head 29, but by preference and as shown, the same is a separate ring 39 which is secured to the hub portion 40 of this driving head in suitable manner as by being splined thereto. Rollers 41 are arranged between the two members of the clutch and the same operate in the usual and well known manner of a one-way clutch.

The screw shaft when operated by the motor has a comparatively slow movement owing to the interposition in the transmission of the reduction gearing and consequently the pinion 26 would ordinarily rotate with the screw shaft and would not be advanced longitudinally along the screw threads. However, in order to enforce such longitudinal movement at the proper time and at the will of the operator, suitable means are provided for preventing such rotary movement of this pinion. The means as herein shown comprises a manually or pedally operated plunger adapted to be projected between two teeth of the pinion to thereby prevent such rotation. In the present instance, such plunger is formed in two parts, a plunger proper indicated at 42 and an actuating member or button 43 which have relative or telescoping movement, one with respect to the other. The button 43 extends through and has its bearing in an opening 44 in the top of the extension casing 5 and is normally held in upward position with a yielding pressure as by means of the coil spring 45. The plunger 42 has its bearing in the central bore of the button and the same is held projected inwardly with a yielding pressure by means of the coil spring 46 bearing at its lower end against the head of the plunger and at its upper end against the internal flange 47 in the bore of the button against which flange the head 48 is normally held spring pressed. This button may be operated either manually or pedally, but in the claims I will use the word "manually" as generic for both operations.

Describing a cycle of operation and beginning with the parts in their normal position as indicated in Fig. 1, when the motor is energized, the torque thereof will be transmitted to the inertia device and to all the parts connected thereto including the reduction gearing and screw shaft, and in a comparatively few seconds such inertia device or flywheel will attain a considerable speed of rotation and considerable energy will thereby be stored or accumulated in the flywheel. When the speed of rotation of the flywheel reaches the desired or predetermined speed, the operator depresses the button 43 and thereby arrests the rotary movement of the pinion 26 and causes the same to be moved longitudinally by screw action in the right hand direction and into engagement with the flywheel 25 of the engine. The torque is thereupon transmitted to such flywheel 25 which will be rotated and the engine thereby cranked. When the engine operates under its own power, the pinion 26 will be automatically demeshed by screw action and the pinion 26 will be restored to its normal position at which time the button 43 has been permitted by the operator to resume its normal position. If, however, such button 43 and the plunger 42 should still remain depressed, no harm will result because of the independent yielding character of such plunger.

The torque being transmitted will cause the drive spring 30 to be wound up as soon as the pinion 26 engages the engine flywheel, and consequently energy will be stored up in this spring and at the moment that the engine flywheel begins to move, a reaction occurs with respect to the drive spring according to which the torque or tension thereof tends to rotate the driving head 29 in a reverse direction. In order to overcome this tendency of reaction and to maintain and utilize this energy in the spring 30 and to insure the delivery thereof only in the direction of the driving member or pinion, the one-way clutch is interposed between such head and the reduction gearing to prevent any unwinding or backward rotation of the drive spring. The stored up energy of the spring will therefore be delivered to full extent to the pinion for cranking purposes.

I claim:

1. An engine starter drive including a driving member adapted to engage and crank a member of the engine to be started, an inertia device, means for operating such device, torque transmission mechanism between said inertia device and driving member including a resilient means to yield under-cranking torque, and a one-way clutch adapted and arranged to prevent in one direction torque transmission between said device and resilient means.

2. An engine starter drive including a driving member adapted to engage and crank a member of the engine to be started, an inertia device, means for operating such device, and torque transmission mechanism between said inertia device and driving member including a resilient means to yield under cranking torque, and means for preventing backward rotation of said resilient means, and means for preventing backward rotation of said inertia device.

3. An engine starter drive including a driving member adapted to engage and crank a member of the engine to be started, an inertia device, means for operating such device, torque transmission mechanism between said inertia device and driving member including a torsion spring, and a clutch adapted and arranged to prevent in one direction torque transmission between said device and said driving member.

4. An engine starter drive including a driving member adapted to engage and crank a member of the engine to be started, an inertia device, means for operating such device, torque transmission mechanism between said inertia device and driving member including a torsion spring, and a one-way clutch adapted and arranged to prevent in one direction torque transmission between said device and spring.

5. An engine starter drive including a driving member adapted to engage and crank a member of the engine to be started, an inertia device, means for operating such device, torque transmission mechanism between said inertia device and driving member including a resilient means yieldable under starting torque a one way clutch adapted and arranged to prevent in one direction torque transmission between said device and resilient means, and a second one way clutch between said operating means and inertia device.

6. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a resilient torque-transmitting means, and a one-way clutch adapted and arranged to prevent in one direction torque transmission between such means and inertia device.

7. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, and a torsion spring at one end connected to said head and at its other end operatively connected with the driving member.

8. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, a second sleeve on which the driving member is mounted for its said longitudinal and rotary movements, and a resilient torque transmitting connection between said head and second sleeve.

9. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, a screw sleeve on which the driving member is threaded for its said longitudinal and rotary movements, and a resilient torque transmitting connection between said head and screw sleeve.

10. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, a second sleeve on which the driving member is mounted for its said longitudinal and rotary movements, and a resilient torque transmitting connection between said member and second sleeve comprising a torsion spring.

11. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, a second sleeve on which the driving member is mounted for its said longitudinal and rotary movements, a resilient torque transmitting connection between said head and second sleeve, and means for controlling the longitudinal movement of the driving member.

12. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, a second sleeve on which the driving member is mounted for its said longitudinal and rotary movements, a resilient torque transmitting connection between said head and second sleeve, and means under the control of the operator for preventing rotary movement of the driving member and compelling longitudinal movement thereof.

13. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, a second sleeve on which the driving member is mounted for its said longitudinal and rotary movements, a resilient torque transmitting connection between said head and second sleeve, and means under the control of the operator for preventing rotary movement of the driving member and compelling longitudinal movement thereof comprising a spring pressed plunger adapted to contact such driving member.

14. An engine starter drive including a driving member adapted to engage and crank a member of the engine to be started, a rotatable driving sleeve, an inertia device connected therewith, a rotatable shaft driven by said sleeve, an actuating mechanism between the shaft and driving member including a driving head mounted on the shaft, a one-way clutch adapted and arranged to prevent in one direction torque-transmission between said inertia device and said head, a second sleeve on which the driving member is mounted for its said longitudinal and rotary movements, a resilient torque transmitting connection between said head and second sleeve, and means under the control of the operator for preventing rotary movement of the driving member and compelling longitudinal movement thereof comprising a two part plunger, one part being adapted to contact such driving member and having a spring pressed relative movement with respect to the other part whereby it may yield to superior rotative pressure of the driving member.

15. An engine starter drive including a driving member adapted to engage and crank a member of the engine to be started, an inertia device, means for operating such device, and torque transmission mechanism between said inertia device and driving member including a resilient torque-transmitting means, reduction gearing between such resilient means and the inertia device, and a one-way clutch adapted and arranged to prevent in one direction torque transmission between the gearing and the resilient means.

16. An engine starter drive including a driving member adapted to engage and crank a member of the engine to be started, an inertia device adapted to store motor cranking energy, means for operating such device, and torque transmission mechanism between said inertia device and driving member including a resilient torque transmitting means and a one-way clutch adapted and arranged to prevent in one direction torque transmission between said operating means and the inertia device.

17. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, resilient torque-transmitting means connected with the driving member, and a one-way clutch adapted and arranged to prevent in one direction torque transmission between said inertia device and said driving member.

18. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, resilient torque-transmitting means connected with the driving member, a one-way clutch for preventing reverse rotation of the driven shaft, and reduction gearing between said sleeve and driven shaft.

19. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, resilient torque-transmitting means operatively connected with the driving member and the driven shaft, a one-way clutch cooperating with the resilient means to prevent reverse rotation thereof, and a second one-way clutch between the driving shaft and the sleeve.

20. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, a second sleeve which is mounted on the driven shaft and on which the driving member is mounted for its said movements, and a resilient means connecting between the second sleeve and the driven shaft.

21. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, a second sleeve which is mounted on the driven shaft and on which the driving member is mounted for its said movements, a driving head loosely mounted on the driven shaft, a one-way clutch arranged to prevent reverse rotation of such head, and a resilient means connecting between the second sleeve and the head.

22. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, a second sleeve which is mounted on the driven shaft and on which the driving member is mounted for its said movements, and a torsion spring connecting between the second sleeve and the driven shaft.

23. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve a second sleeve which is mounted on the driven shaft and on which the driving member is mounted for its said movements, a resilient means connecting between the second sleeve and the driven shaft, and manual means for controlling the longitudinal movement of the driving member.

24. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, a screw sleeve which is mounted on the driven shaft and on which the driving member is mounted for its said movements, a resilient means connecting between the screw sleeve and the driven shaft, said driving member being in the form of a pinion, and a spring pressed plunger adapted to be projected between teeth of the pinion.

25. An engine starter drive including a driving member adapted to engage and crank a member of the engine to be started, a driving shaft, a driven shaft in alinement with the driving shaft, a sleeve mounted on both of said shafts and operatively connected therewith, an inertia device connected with the sleeve, resilient torque-transmitting means operatively connected with the driving member and said driven shaft, a one-way clutch for preventing reverse rotation of the driven shaft, and a casing having bearings for said sleeve and driven shaft and the clutch.

26. An engine starter drive including a driving member adapted to engage and crank a member of the engine to be started a driving shaft, a driven shaft in alinement with the driving shaft, a sleeve mounted on both of said shafts and operatively connected therewith, an inertia device connected with the sleeve, resilient torque-transmitting means operatively connected with the driving member and said driven shaft, a one-way clutch between the driven shaft, planetary gearing for preventing reverse rotation of said sleeve and driven shaft including a stationary internal gear, and a casing having bearings for said sleeve and driven shaft and the clutch and supporting said gear.

27. In an engine starter a driving member adapted for rotary and longitudinal movement into engagement with a member of the engine to be started, mounting means for said driving member, means for actuating said driving member and torque-transmission mechanism between the member and driving means including a resilient means adapted to yield under cranking torque and a one way clutch operatively connected to said resilient means, said one way clutch being adapted to prevent backward rotation of said resilient means.

28. An engine starter drive including a driving member adapted to engage and crank a member of the engine to be started, a rotatable driving sleeve, means operatively connected to said sleeve for actuating the same, a rotatable shaft driven by said sleeve, and actuating mechanism between the shaft and driving member including a driving head mounted on the shaft, a one way clutch adapted and arranged to prevent in one direction torque-transmission between said shaft and said head, a second sleeve on which the driving member is mounted for its said longitudinal and rotary movements, and a resilient torque-transmitting connection between said head and second sleeve.

In testimony whereof, I have subscribed my name.

WILLIAM L. McGRATH.